US006772265B2

(12) United States Patent
Baweja et al.

(10) Patent No.: US 6,772,265 B2
(45) Date of Patent: Aug. 3, 2004

(54) DOCKING STATION FOR A LAPTOP COMPUTER

(75) Inventors: Baljeet S. Baweja, Austin, TX (US); Kulvir S. Bhogal, Austin, TX (US); Nizamudeen Ishmael, Jr, Austin, TX (US); Mandeep Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 09/734,827

(22) Filed: Dec. 11, 2000

(65) Prior Publication Data

US 2002/0073247 A1 Jun. 13, 2002

(51) Int. Cl.[7] ............................................. G06F 13/00
(52) U.S. Cl. ........................ 710/303; 710/1; 345/905; 345/501; 353/119
(58) Field of Search ................................ 345/905, 501; 353/119; 710/303, 1

(56) References Cited

U.S. PATENT DOCUMENTS

| | | | |
|---|---|---|---|
| 5,301,227 A | | 4/1994 | Kamei et al. |
| 5,630,174 A | * | 5/1997 | Stone et al. .................. 710/63 |
| 5,639,152 A | * | 6/1997 | Nelson ........................ 353/119 |
| 5,651,599 A | * | 7/1997 | Fujimori et al. ............... 353/61 |
| 5,664,859 A | * | 9/1997 | Salerno et al. ............... 353/119 |
| 5,803,569 A | | 9/1998 | Ma |
| 5,823,651 A | | 10/1998 | Helot et al. |
| 5,841,994 A | * | 11/1998 | Boesch et al. .............. 710/113 |
| 5,890,084 A | | 3/1999 | Halasz et al. |
| 5,993,012 A | * | 11/1999 | Buchanan et al. .......... 353/119 |
| 6,088,752 A | * | 7/2000 | Ahern ........................ 710/303 |
| 6,141,021 A | * | 10/2000 | Bickford et al. ............ 345/503 |
| 6,282,646 B1 | * | 8/2001 | Hendry et al. .............. 713/100 |
| 6,626,543 B2 | * | 9/2003 | Derryberry ................. 353/119 |

FOREIGN PATENT DOCUMENTS

| | | | |
|---|---|---|---|
| DE | 4019755 A1 | * 1/1992 | ......... G03B/21/132 |
| EP | 834793 A2 | * 4/1998 | ............. G06F/1/16 |
| JP | 56110356 A | 9/1981 | |
| JP | 57160234 A | 10/1982 | |
| JP | 08162864 | 1/1998 | |
| JP | 09025357 | 8/1998 | |
| JP | 09049468 | 9/1998 | |
| JP | 09272712 | 4/1999 | |
| JP | 09120794 | 11/1999 | |
| JP | 10110740 | 11/1999 | |
| JP | 10164148 | 12/2000 | |
| WO | WO 97/49571 | 12/1997 | |

OTHER PUBLICATIONS

Webopedia, "Video Adapter", Jun. 01, 2001, p. 1–2, available at <www.webopedia.com>.*

* cited by examiner

*Primary Examiner*—Mark H. Rinehart
*Assistant Examiner*—Donna K. Mason
(74) *Attorney, Agent, or Firm*—Cardinal Law Group; Jeffrey S. LaBaw

(57) ABSTRACT

A laptop computer and a docking station are disclosed. The laptop computer includes a microprocessor and a first video card in electrical communication with the microprocessor. The docking station includes a projector and a second video card in electrical communication with the projector. Upon a mounting of the laptop on the docking station, an electrical communication is established between the microprocessor and the second video card, and an electrical communication is established between the projector and the first video card. The microprocessor selectively provides control signals to either the first video card or the second video card. The first video card provides video signals to the projector in response to the control signals, and the second video card provides the video signals to the projector in response to the control signals. The projector provides video images in response to the video signals as received from either the first video card or the second video card.

16 Claims, 2 Drawing Sheets

DOCKING STATION FOR A LAPTOP COMPUTER

BACKGROUND OF THE INVENTION

1. Field of the Invention

The present invention generally relates to docking stations for laptop computers, and in particular to a docking station housing a projector and a video card that are controlled by the microprocessor of the laptop.

2. Description of the Related Art

A laptop computer typically includes an internal video card for providing video signals to a projector as directed by an execution of a video application program by a microprocessor of the laptop. In light of the fact that the video card of the laptop computer is not customarily upgraded, the video card may not have the performance capability of providing the video signals to the projector as needed for a quality presentation of an advanced video application program. For example, to project clear, concise, and timely images from the projector, the video application program may require a minimum fill rate that is above the maximum fill rate capability of the laptop's video card. Other performance features such as frame rate and refresh rate may have minimum standards that are also above the maximum capabilities of the laptop's video card.

Currently, when a performance capability of the laptop's video card is insufficient for the video application program, a desktop computer having a video card capable of supporting the video application program is utilized in lieu of the laptop. However, transporting a desktop to a presentation is rarely feasible. Additionally, assembling and dismantling the desktop may be burdensome. What is therefore needed is a presentation method incorporating a laptop and a projector that can overcome any deficiencies in the performance capability of the laptop's video card.

SUMMARY OF THE INVENTION

The present invention is a laptop computer and a docking station for the laptop computer. In one form of the present invention, the docking station includes a housing, a projector, and a video card. The projector is mounted within the housing, and is operable to provide video images in response to video signals. The video card is inserted within the housing and is operable to provide the video signals to the projector.

In a second form of the present invention, the docking station includes a projector and a first video card, and the laptop computer includes a microprocessor and a second video card. The projector is operable to provide video images in response to video signals. The first video card and the second video card are both operable to provide the video signals to the projector in response to control signals. The microprocessor is operable to selectively provide the control signals to either the first video card or the second video card.

A third form of the present invention is a computer readable product in a computer usable medium of the laptop computer. The computer readable product includes a means for comparing a first performance capability of a first video card and a second performance capability of a second video card, a means for providing controls signals to the first video card when the first performance capability of the first video card and the second performance capability of the second video card are equivalent, and a means for providing the controls signals to the second video card when the first performance capability of the first video card and the second performance capability of the second video card are dissimilar.

A fourth form of the present invention is a method for selectively operating a first video card and a second video card. In one embodiment, a microprocessor is operated to compare the performance capability of a first video card and the second performance capability of the second video card, and to provide control signals to the first video card when the performance capability of the first video card and the performance capability of the second video card are equivalent. In another embodiment, control signals are provided to the first video card when the performance capability of the first video card and the performance capability of the second video card are equivalent, and the control signals are provided the second video card when the performance capability of the first video card and the performance capability of the second video card are dissimilar. In a third embodiment, a selection signal indicative of a selected utilization of the first video card or the second video card is provided, control signals are provided to the first video card when the selection signal indicates a selected utilization of the first video card, and the control signals are provided to the second video card when said selection signal indicates a selected utilization of the second video card.

A fifth form of the present invention is a method comprising a providing of the docking station and the laptop computer mountable upon the docking station. In a first embodiment, the docking station includes a first video card, and the laptop computer includes a microprocessor and a second video card in electrical communication with the microprocessor. The first embodiment further comprises providing for an establishment of an electrical communication between the microprocessor and the first video card when said laptop computer is mounted upon the docking station. In a second embodiment, the docking station includes a projector, and the laptop computer includes a microprocessor and a video card in electrical communication with the microprocessor. The second embodiment further comprises providing for an establishment of an electrical communication between the projector and the video card when the laptop computer is mounted upon the docking station.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
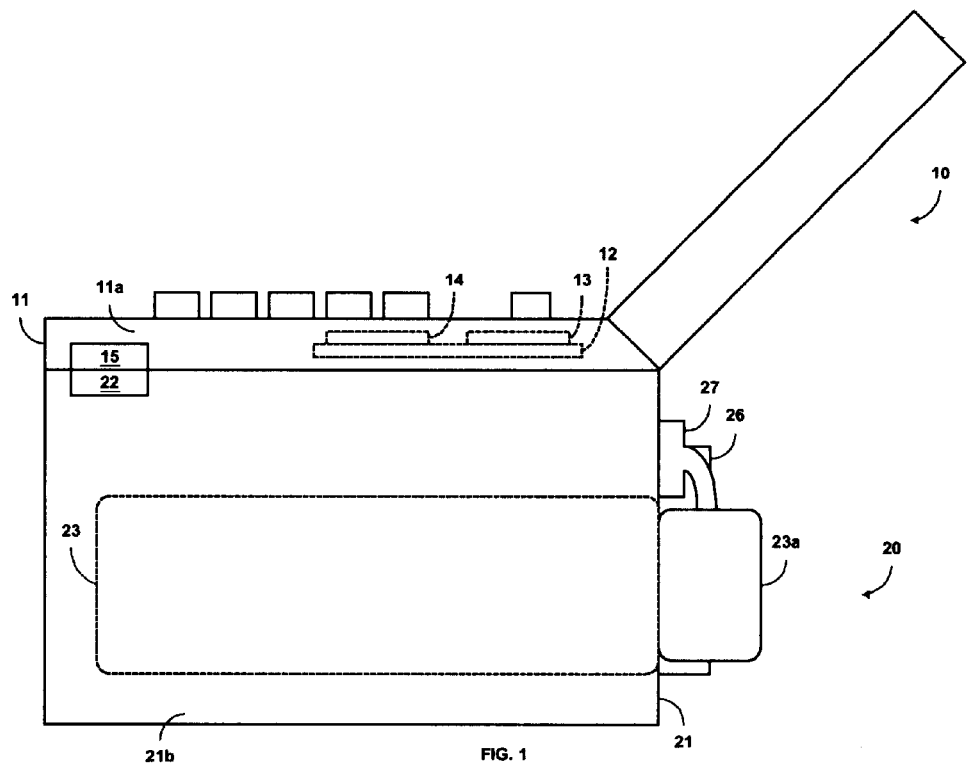
FIG. 1 is a side view of one embodiment of a laptop computer in accordance with the present invention mounted upon one embodiment of a docking station in accordance with the present invention.
Figure 2:
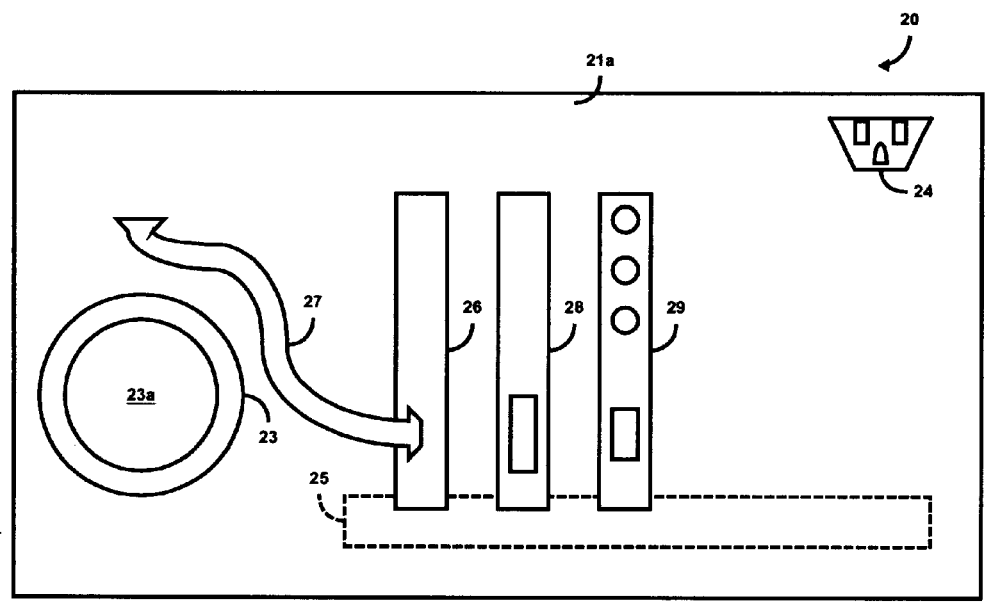
FIG. 2 is a front view of the FIG. 1 docking station.

"Referring to FIGS. 1 and 2, a laptop 10 and a docking station 20 in accordance with the present invention are shown. Laptop 10 includes a base cover 11 mounted upon a top surface of a housing 21 of docking station 20. Laptop 10 further includes a motherboard 12, a microprocessor 13, and a video card 14. Motherboard 12 is mounted within base cover 11. Microprocessor 13 is plugged into motherboard 12, and is operable to interpret and execute operation and application programs. Video card 14 is plugged into motherboard 12, and is operable to provide video signals as commanded by microprocessor 13. An example of a video card suitable to serve as video card 14 is the REALMAGIC NETSTREAM 2000 MPEG II Video Card.""The performance capabilities of video card 14 are known by microprocessor 13 in one of a variety of ways. For example, a hardware configuration table including a list of performance capabilities of video card 14 or a program for accessing the performance capabilities of video card 14 can be stored in a memory of laptop 10. Also by example, a user of laptop 10 can download information relating to the performance capability of video card 14."

Base cover 11 of laptop 10 has a bus 15 mounted adjacent a lower edge of a side surface 11a of base cover 11. Housing 21 has a bus 22 mounted adjacent an upper edge of a side surface 21b of housing 21. As will be subsequently described herein, bus 15 and bus 22 facilitate electrical communication between components of laptop 10 and components of docking station 20 when laptop 10 is mounted upon docking station 20 as shown.

Docking station 20 includes a projector 23, a motherboard 25, a video card 26, an adapter card 28, and a sound card 29. Projector 23 and mother board 25 are mounted within and to housing 21. Video card 26, adapter card 28, and sound card 29 are removably inserted within a surface 21a of housing 21.

A power signal applied to an AC power connector 24 operates projector 23 to provide video images in response to video signals. Projector 23 is electrically coupled to bus 22 to receive video signals from video card 14 as selectively commanded by microprocessor 13. A lens 23a of projector 23 extends from a surface 21a of housing 21 to enable focal adjustments of the projected images during a graphic presentation.

"Motherboard 25 is electrically coupled to bus 22 and AC power connector 24. Video card 26 is plugged into motherboard 25 to facilitate electrical communication from microprocessor 13 to video card 26. A cable 27 is coupled to a video out connector of video card 26 and a video input connector of projector 23 to facilitate electrical communication of video signals from video card 26 to projector 23 as selectively commanded by microprocessor 13. Adapter card 28 is plugged into motherboard 24 to facilitate electrical communication from microprocessor 13 to adapter card 28 Sound card 29 is plugged into motherboard 25 to facilitate electrical communication from microprocessor 13 to and sound card 29."

"Housing 21 is dimensioned to accommodate the typical dimensions of commercially available cards suitable to be serve as video card 26, adapter card 28, and sound card 29 as plugged into motherboard 25. For example, a video card suitable to serve as video card 26 is an AGP Upgradeable Video Graphics Adapter, an adapter card suitable to serve as adapter card 28 is a PCI SCSI adapter card for an external CD writer, and a sound card suitable to serve as sound card 29 is an ISA Multimedia sound card. Accordingly, a fitting of projector 23 within housing 21 could necessitate a rearrangement of components of projector 23. Alternatively, a commercially available projector having comparable dimensions to commercially available cards can be utilized to server as projector 23. Examples of such projectors are an EPSON PL 710C projector, an INFOCUS LP 335 projector, a NEC VT series projector, and a SONY VPL-CS1 projector."

In other embodiments of a docking station in accordance with the present invention, the adapter cards may be removably inserted through surface 21a of housing 21, (i.e. using a removable panel) and plugged into motherboard 25. Additionally, a microprocessor may be plugged into motherboard 25 to control video card 26, adapter card 28, sound card 29, and/or any other cards as commanded by microprocessor 13. Housing 21 is dimensioned accordingly.

Figure 3:
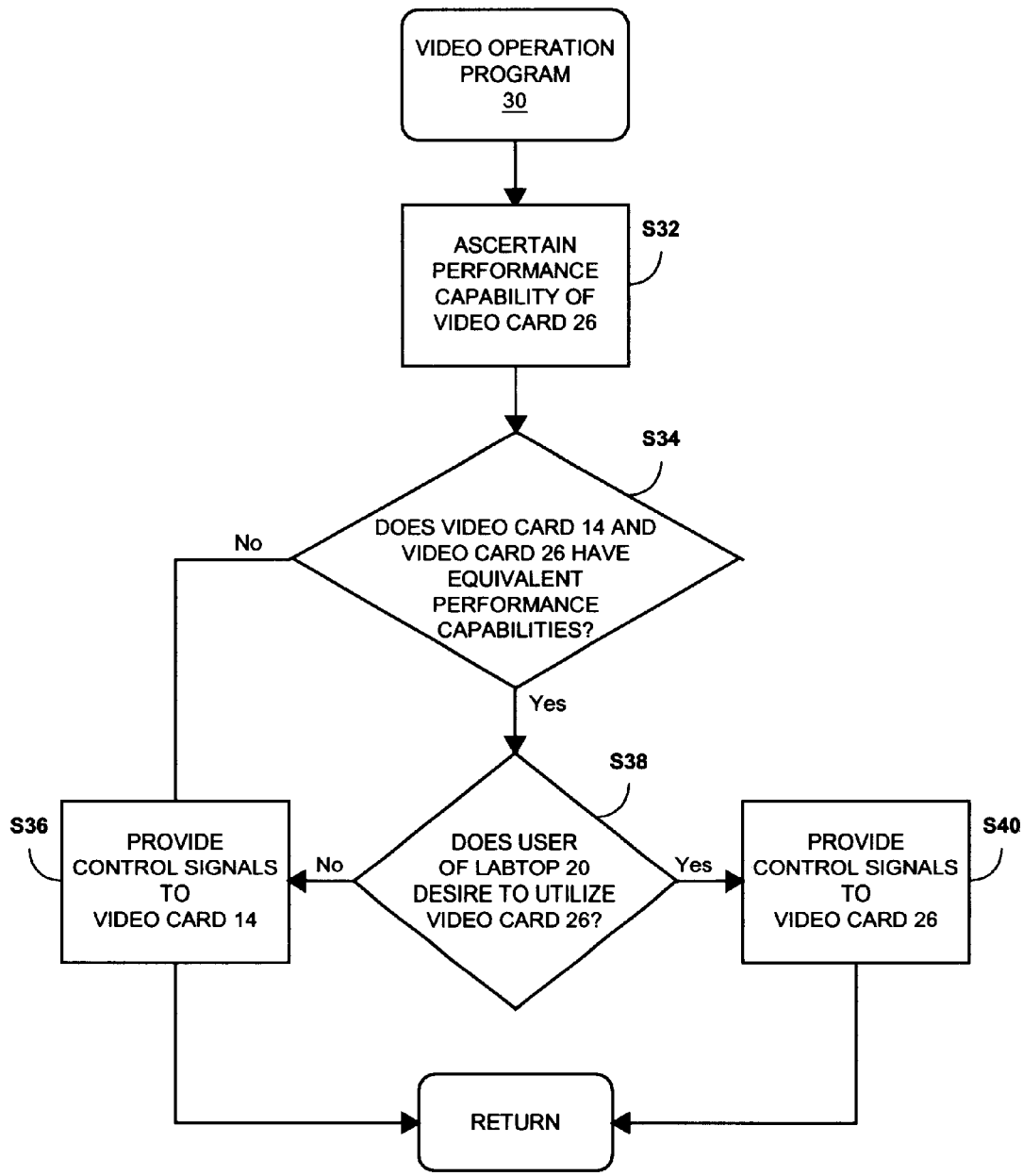
FIG. 3 is flow chart of one embodiment of a video operating program in accordance with the present invention.

Referring to FIG. 3, a flow chart of a video operating program 30 as executed by microprocessor 13 (FIG. 1) is shown. Video operating program 30 is stored within a memory (not shown) of laptop 10, and is executed prior to or upon an execution of a video application program. During stage S32, microprocessor 13 ascertains the performance capability of video card 26 in one of a variety of ways as would occur to one skilled in the art. For example, a program for accessing the performance capabilities of video card 26 can be stored in a memory of laptop 10. Also by example, a user of laptop 10 can download information relating to the performance capability of video card 26.

During stage S34, microprocessor 13 determines if the performance capability of video card 14 (FIG. 1) is equivalent to the performance capability of video card 26 (FIG. 2). For example, microprocessor 13 may compare the fill rate, the refresh rate, and the frame rate capabilities of video card 14 and video card 26 to determine if such capabilities of video card 14 are equal to or greater than such capabilities of video card 26. If microprocessor 13 determines that the performance capability of video card 14 is equivalent to the performance capability of video card 26, then microprocessor 13 proceeds to stage S36 to provide control signals to video card 14. Video card 14 provides video signals to projector 23 (FIG. 1) in response to the control signals via bus 15 and bus 22.

If microprocessor 13 determines that the performance capability of video card 14 is dissimilar to the performance capability of video card 26, then microprocessor 13 proceeds to stage S38 to determine if a user of laptop 10 desires to utilize video card 14 or video card 26. During stage S38, a prompt requesting a selection of video card 14 or video card 26 can be displayed on laptop 10. A chart comparing the performance capabilities of video card 14 and video card 26 can also be displayed, or a program for suggesting which video card is more suitable for the video application program can be executed. For example, a chart comparing the refresh rates of video card 14 and video card 26 would enable a user to ascertain the faster of the two video cards. The user of laptop 10 activates an input device which provides a selection signal as would occur to one skilled in the art.

If microprocessor 13 determines that the user of laptop 10 selected video card 14, e.g., the selection signal indicates a selection of video card 14, then microprocessor proceeds to stage S36 as previously described herein. If microprocessor 13 determines that the user of laptop 10 selected video card 26, e.g., the selection signal indicates a selection of video card 26, then microprocessor proceeds to stage S40 to provide the control signals to video card 26 via bus 15 and bus 22. Video card 26 provides video signals to projector 23 in response to the control signals via cable 27.

In other embodiments of a video operation program in accordance with the present invention, stages S32 and S34 may be omitted; stage S38 may be omitted with a procession to stage S36 when microprocessor 13 determines during stage S34 that the performance capability of video card 14 is equivalent to the performance capability of video card 26; or stage S38 may be omitted with a procession to stage S40 when microprocessor 13 determines during stage S34 that the performance capability of video card 14 is dissimilar to the performance capability of video card 26.

It is to be appreciated that a cost savings to a user of laptop 10 and docking station 20 is realized over time due to the ability of the user to remove video card 26 from docking station 20 and to replace video card 26 with an improved video card. As a replacement video card for the docking station is a video card suitable for a desktop computer, the purchase price and service cost of a video card for a desktop computer is much lower than the purchase price and service cost of a video card for laptop 10, significant savings can be realized. Indeed, the cost savings could extend to an entire organization and its clients and business associates. Since the docking station video card is shared among many users and only needs to be upgraded once, rather than upgrading many laptops.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A system, comprising:
   a docking station including
      a projector operable to provide a plurality of video images in response to a plurality of video signals, and
      a first video card operable to provide said plurality of video signals to said projector in response to a plurality of control signals; and
   a laptop computer including
      a second video card operable to provide said plurality of video signals to said projector in response to said plurality of control signals, and
      a microprocessor operable to selectively provide said plurality of control signals to either said first video card or said second video card.

2. The system of claim 1, wherein
   said docking station further includes a housing, said projector mounted within said housing, and said first video card inserted within said housing.

3. The system station of claim 2, wherein
   said first video card is removably inserted within said housing to thereby facilitate a replacement of said first video card with a third video card.

4. The system of claim 1, further comprising:
   a cable,
      wherein said projector includes a video input connector, said first video card includes a video output connector, and said cable electrically couples said video input connector and said video output connector to thereby facilitate said provision of said plurality of video signals from said first video card to said projector.

5. The system of claim 1, wherein:
   said laptop computer further includes a computer program product including
      a means for operating said microprocessor to compare a first performance capability of said first video card and a second performance capability of said second video card;
      a means for operating said microprocessor to provide said plurality of controls signals to said first video card when said first performance capability of said first video card and said second performance capability of said second video card are equivalent; and
      a means for operating said microprocessor to provide said plurality of controls signals to said second video card when said first performance capability of said first video card and said second performance capability of said second video card are dissimilar.

6. The system of claim 5, wherein
   said computer program product further includes a means for providing said plurality of controls signals to said first video card when said first performance capability of said first video card and said second performance capability of said second video card are dissimilar.

7. A computer program product in a computer usable medium, comprising:
   a means for comparing a first performance capability of a first video card, and a second performance capability of a second video card;
   a means for providing a plurality of controls signals to said first video card when said first performance capability of said first video card and said second performance capability of said second video card are equivalent; and
   a means for providing said plurality of controls signals to said second video card when said first performance capability of said first video card and said second performance capability of said second video card are dissimilar.

8. The computer program product of claim 7, further comprising:
   a means for providing said plurality of controls signals to said first video card when said first performance capability of said first video card and said second performance capability of said second video card are dissimilar.

9. A method of selectively operating a first video card and a second video card, said method comprising:
   comparing a first performance capability of a first video card and a second performance capability of a second video card;
   sending a plurality of control signals to said first video card when said first performance capability of said first video card and said second performance capability of said second video card are equivalent.

10. The method of claim 9, further comprising:
    sending said plurality of control signals to said second video card when said first performance capability of said first video card and said second performance capability of said second video card are dissimilar.

11. The method of claim 9, further comprising:
    receiving a selection signal indicative of a selected utilization of either the first video card or the second video card when the first performance capability of the first video card and the second performance capability of the second video card are dissimilar;
    sending said plurality of control signals to the first video card in response to said selection signal indicating a selected utilization of the first video card; and
    sending said plurality of control signals to the second video card in response to said selection signal indicating a selected utilization of the second video card.

12. A method of operating a projector, said method comprising:

sending a plurality of control signals to a first video card when a first performance capability of said first video card and a second performance capability of a second video card are equivalent;

sending a plurality of video signals from said first video card to the projector in response to a receipt of said plurality of control signals by said first video card;

sending said plurality of control signals to said second video card when said first performance capability of said first video card and said second performance capability of said second video card are dissimilar; and sending said plurality of video signals from said second video card to the projector in response to a receipt of said plurality of control signals by said second video card.

13. A method, comprising:

providing a docking station including a projector; and providing a laptop computer including a microprocessor and a video card, said laptop computer being mountable upon said docking station, said microprocessor in electrical communication with said video card; and establishing an electrical communication between said projector and said video card when said laptop computer is mounted upon said docking station.

14. A method of operating a projector, said method comprising:

operating a microprocessor to compare a first performance capability of a first video card and a second performance capability of a second video card;

operating said microprocessor to provide a plurality of control signals to said first video card when said first performance capability of said first video card and said second performance capability of said second video card are equivalent; and operating said first video card to provide a plurality of video signals to the projector in response to said plurality of control signals.

15. The method of claim 14, further comprising:

operating said microprocessor to provide said plurality of control signals to said second video card when said first performance capability of said first video card and said second performance capability of said second video card are dissimilar; and operating said second video card to provide said plurality of video signals to the projector in response to said plurality of control signals.

16. The method of claim 14, further comprising:

operating said microprocessor to receive a selection signal indicative of a selected utilization of either said first video card or said second video card when said first performance capability of said first video card is and said second performance capability of said second video card are dissimilar;

operating said microprocessor to provide said plurality of control signals to said first video card in response to said selection signal indicating a selected utilization of said first video card;

operating said first video card to provide said plurality of video signals to the projector in response to said plurality of control signals;

operating said microprocessor to provide said plurality of control signals to said second video card in response to said selection signal indicating a selected utilization of said second video card; and operating said second video card to provide a plurality of video signals to the projector in response to said plurality of control signals.

* * * * *